(12) United States Patent
Vestal

(10) Patent No.: US 7,675,919 B2
(45) Date of Patent: Mar. 9, 2010

(54) END SYSTEM SCHEDULING FOR SWITCHED NETWORKS

(75) Inventor: Stephen C. Vestal, North Oaks, MN (US)

(73) Assignee: Honeywell International Inc., Morristown, NJ (US)

( * ) Notice: Subject to any disclaimer, the term of this patent is extended or adjusted under 35 U.S.C. 154(b) by 545 days.

(21) Appl. No.: 11/461,930

(22) Filed: Aug. 2, 2006

(65) Prior Publication Data

US 2008/0031282 A1 Feb. 7, 2008

(51) Int. Cl.
*H04L 12/28* (2006.01)

(52) U.S. Cl. .................................. 370/395.4

(58) Field of Classification Search ................ 370/229, 370/230, 231, 235, 389, 385, 395.1, 395.43, 370/395.42, 411, 412; 709/231, 223; 718/100; 710/5, 33, 65
See application file for complete search history.

(56) References Cited

U.S. PATENT DOCUMENTS

| | | | | |
|---|---|---|---|---|
| 5,926,458 | A * | 7/1999 | Yin | 370/230 |
| 6,189,022 | B1 * | 2/2001 | Binns | 718/100 |
| 6,694,382 | B1 * | 2/2004 | Kovalan et al. | 710/5 |
| 6,801,943 | B1 * | 10/2004 | Pavan et al. | 709/226 |
| 6,965,566 | B2 * | 11/2005 | Kawasaki et al. | 370/235 |
| 2005/0237930 | A1 | 10/2005 | Patt-Shamir et al. | |
| 2007/0121499 | A1 * | 5/2007 | Pal et al. | 370/230 |
| 2007/0168482 | A1 * | 7/2007 | Chen et al. | 709/223 |

OTHER PUBLICATIONS

Almeida, Luis et al., "Schedulability Analysis of Real-Time Traffic in Worldfip Networks: an Integrated Approach", "IEEE Transactions on Industrial Electronics", Oct. 2002, pp. 1165-1174, vol. 49, No. 5, Publisher: IEEE, Published in: US.

Menkhaus, Guido et al., "Towards Efficient Use of Shared Communication Media in the Timed Model", "Proceedings of the 11th IEEE Real Time on Embedded Technology and Applications Symposium", 2005, pp. 342-351, Publisher: IEEE Computer Society, Published in: US.

Pedreiras, Paulo et al., "Combining Event-Triggered and Time-Triggered Traffic in FTT-CAN: Analysis of the Asynchronous Messaging System", "Factory Communication Systems", Sep. 6, 2000, pp. 67-75, Publisher: IEEE, Published in: Porto, Portugal.

Vestal, Steve, "Metah Support for Real-Time Multi-Processor Avionics", "Proceedings of the 1997 Joint Workshop on Parallel and Distributed Real-Time Systems (WPDRTS / OORTS '97)", 1997, pp. 11-21, Publisher: WPDRTS, Published in: Minneapolis, US.

(Continued)

*Primary Examiner*—Frank Duong
(74) *Attorney, Agent, or Firm*—Fogg & Powers LLC

(57) ABSTRACT

A method for scheduling one or more data packet transfers over a computer-based distributed network is disclosed. The method involves constructing a cyclic schedule from a plurality of data packets, wherein the cyclic schedule is constructed to ensure that each data packet transfer is substantially free of jitter. The method further involves synchronizing the cyclic schedule with at least one periodic processing schedule and transmitting the synchronized data packets as arranged by the cyclic schedule.

20 Claims, 4 Drawing Sheets

OTHER PUBLICATIONS

European Patent Office, "European Search Report", Nov. 26, 2008. Published in: EP.

Almeida, Luis and Paulo Pedreiras, "Scheduling within Temporal Partitions: Response-time Analysis and Server Design", "Proceedings of the Fourth ACM Conference on Embedded Software (EMSOFT)", 2004, pp. 95-103, Publisher: ACM.

"Preliminary Draft 3 of Project Paper 664 Aircraft Data Network Part 7; Avionics Full Duplex Switched Ethernet (AFDX) Net", "ARINC 664 Part 7 (AFDX) Committee", Jun. 27, 2005, Publisher: Aeronics Radio, Inc., Published in: Annapolis MD.

Binns, Pam, "A Robust High-Performance Time Partitioning Algorithm: The Digital Engine Operating System (DEOS) Approach", "Digital Avionics Systems Conference (DASC)", Oct. 2001, pp. 1-12, Published in: Orlando FL.

Binns, Pam, "Real-Time Estimation of Event-Driven Traffic Latency Distributions when Layered on Static Schedules", "Proceedings of the 2003 IEEE International Conference on Dependable Systems and Networks", 2003, pp. 573-582, Publisher: IEEE, Published in: San Francisco, CA.

Binns, Pam, "Statistical Estimation of Response Times when Scheduled on top of Static Timelines", "Proceedings of the 1st International Workshop on Probabilistic Analysis Techniques for Real-Time and Embedded Systems", Sep. 2004, Published in: Pisa Italy.

Bisson, Ken and Troy Troshynski, "Switched Ethernet Testing for Avionics Applications", "IEEE A & E Systems Magazine", 2004, pp. 31-35, Publisher: IEEE.

Le Boudec et al., "A Short Tutorial on Network Calculus 1: Fundamental Bounds in Communication Networks", "IEEE International Symposium on Circuits and Systems", May 28-31, 2000, pp. IV-93 thru IV-96, Publisher: IEEE, Published in: Geneva, Switzerland.

Le Boudec, Jean-Yves and Patrick Thiran, "Network Calculus: a Theory of Deterministic Queuing Systems for the Internet", "http://ica1www.eptch/PS_files/NetCal.htm", May 10, 2004, Publisher: Springer Verlag - LNCS 2050.

Le Boudec, Jean-Yves, "Network Calculus Made Easy", "http://lrcwww.epft.ch,", Dec. 14, 1996, p. 1, Publisher: Technical Report EPFL-DI 96-218; Laboratoire de Reseaux De Communication Ecole Polytechnique Federale de Lausanne (EPFL).

Chuang et al., "Matching Output Queuing with a Combined Input/Output-Queued Switch", "IEEE Journal on Selected Areas in Communications", Jun. 1999, pp. 1030-1039, vol. 17, No. 6, Publisher: IEEE.

"Escape Tool Users' Guide: Version 3.3.1", "Honeywell Technology Solutions Laboratory", Aug. 23, 2004, No. 3.3.1, Publisher: Honeywell Labs.

"Ethernet Tutorial", "accessed Oct. 13, 2009 http://burks.brighton.ac.uk/burks/pcinfo/hardware/ethernet" Publisher: University of Brighton.

George et al., "Preemptive and Non-Preemptive Real-Time Uni-Processor Scheduling", "Technical Report No. 2966", Sep. 1996, Publisher: Institut National de Recherche en Informatique et en Automatique (INRIA).

Lee et al., "Safety and Certification Approaches for Ethernet-Based Aviation Databuses", "Report prepared for the U.S. Department of Transportation developed under contract from the Office of Aviation Research", Dec. 2005, pp. 1-124.

Harchol-Balter, Mor et al., "Size-Based Scheduling to Improve Web Performance", "ACM Transactions on Computer Systems", May 2003, pp. 207-233, vol. 21, No. 2, Publisher: ACM.

Joseph et al., "Finding Response Times in a Real-Time System", "The Computer Journal", 1986, pp. 390-395, vol. 29, No. 5.

Le Boudec et al., "A Short Tutorial on Network Calculus II: Min-Plus System Theory Applied to Communication Networks", "Proceedings ISCAS 2000", May 28-31, 2000, Publisher: IEEE.

Marsan et al., "On the Throughput of Input-Queued Cell-Based Switches with Multicast Traffice", "Proceedings of IEEE INFOCOM 2001", Apr. 22-26, 2001, pp. 1664-1672, vol. 3, Publisher: IEEE.

Spuri, Marco, "Analysis of Deadline Scheduled Real-Time Systems", "Report No. 2772", Jan. 1996, Publisher: Institut National de Recherche en Informatique et en Automatique (INRIA).

Steinhammer, Klaus, "A TT-Ethernet Switch based on COTS-Components", "Technical Report from the Real-Time Systems Group", May 2004, Publisher: Vienna University of Technology.

Tindell. Ken and John Clark, "Holistic Schedulability Analysis for Distributed Hard Real-Time Systems", "Microprocessing and Microprogramming ", Apr. 1994, pp. 117-134, vol. 40, No. 2-3, Publisher: Elsevier Science Publishers B. V.

Vestal, Steve, "Real-Time Sampled Signal Flows through Asynchronous Distributed Systems", "Real-Time Applications Symposium", Mar. 2005, Publisher: IEEE, Published in: San Francisco, CA.

* cited by examiner

END SYSTEM SCHEDULING FOR SWITCHED NETWORKS

BACKGROUND

An ever-increasing number of manufacturers are adopting integrated modular software architectures into their products. This type of software architecture generally refers to distributed, real-time (that is, switched) computer networks within a product or system. A typical switched network will consist of several computing modules capable of supporting numerous applications. Each application, in turn, is considered to have varying degrees of safety criticality levels. A typical integrated modular software architecture uses a layered approach to allow for hardware and software transparency. Software code re-use and portability is also an important feature. These architectures are designed such that one or more applications can be inserted or altered with minimum impact on other applications and their supporting safety features. In addition, the switched networks have a built-in capability to operate in the presence of a failure, allowing for periods of maintenance-free operation.

Traditionally, measuring jitter has been critical to determining the performance of switched networks such as the one described above. As the data rates of switched networks continue to increase, reducing jitter becomes an even higher priority for ensuring a high level of reliability. A standard definition of jitter is "the deviation of a timing event of a signal from its ideal position." Jitter affects the network as a whole, and can be introduced by every network element used to generate, convey and receive communication signals within the network. In defining fault-tolerant aspects for network architectures, various networking communications standards will mandate that the jitter of a periodic packet stream leaving an end system (that is, a processor transmitting data packets into the switched network) be tightly constrained. Traditional switched network scheduling methods that place the data packets in a typical data queue will only meet these tights constraints at low traffic loads without introducing significant jitter into the network.

SUMMARY

The following specification addresses end system scheduling for switched networks. Particularly, in one embodiment, a method for scheduling one or more data packet transfers over a computer-based distributed network is provided. The method involves constructing a cyclic schedule from a plurality of data packets, wherein the cyclic schedule is constructed to ensure that each data packet transfer is substantially free of jitter. The method further involves synchronizing the cyclic schedule with at least one periodic processing schedule and transmitting the synchronized data packets as arranged by the cyclic schedule.

DRAWINGS

These and other features, aspects, and advantages will become better understood with regard to the following description, appended claims, and accompanying drawings where:

Like reference numbers and designations in the various drawings indicate like elements.

DETAILED DESCRIPTION

Figure 1:
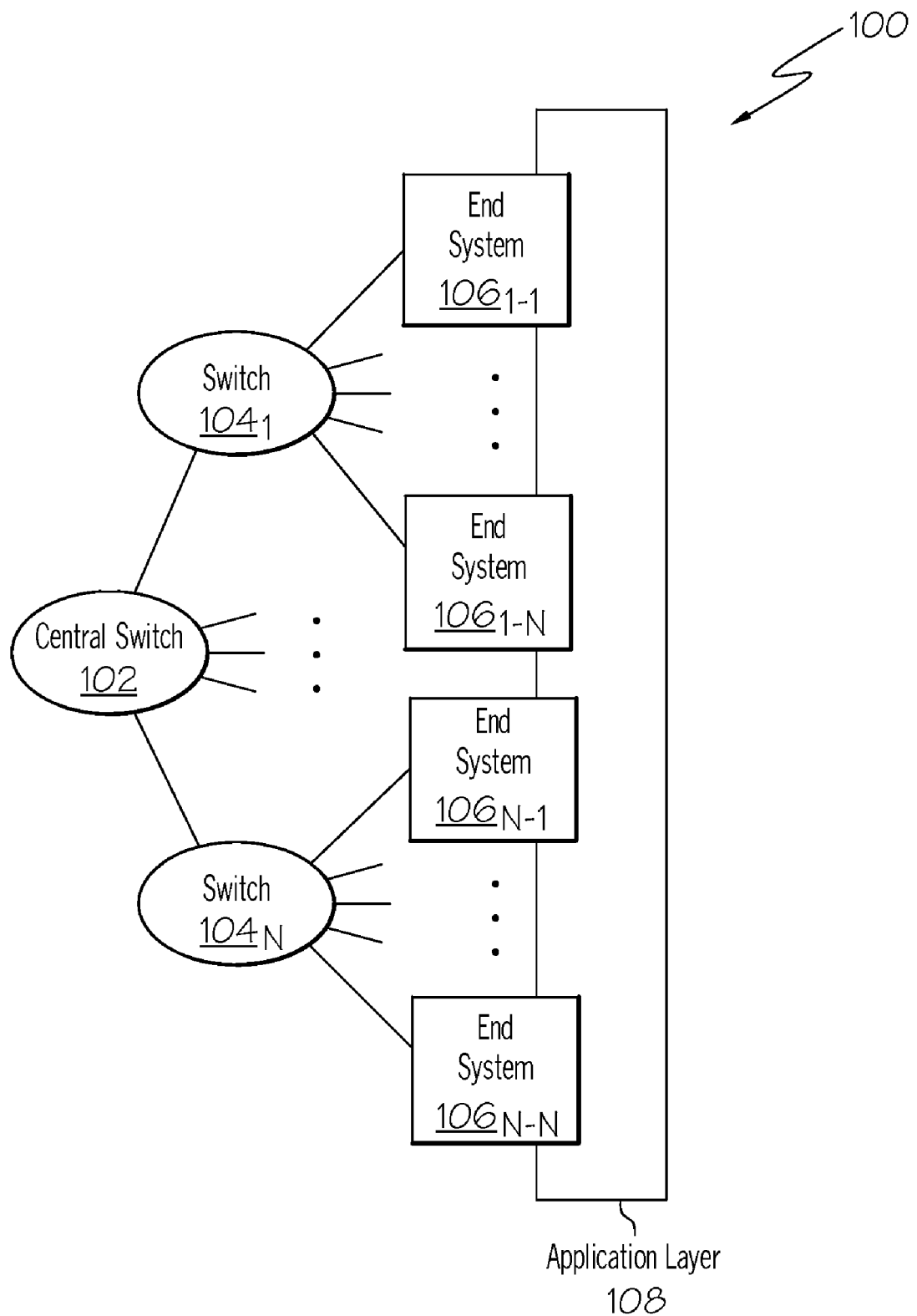
FIG. 1 is a block diagram of an embodiment of a switched network.

FIG. 1 is a block diagram of an embodiment of a switched network 100. The switched network 100 comprises a central switch 102, switches $104_1$ and $104_N$, and end systems $106_{1-1}$ to $106_{N-N}$. In the example embodiment of FIG. 1, the switched network 100 is in communication with an application layer 108. It is noted that for simplicity in description, a total of two switches $104_1$ and $104_N$ and four end systems $106_{1-1}$ to $106_{N-N}$ are shown in FIG. 1. However, it is understood that in other embodiments of the switched network 100, different numbers of switches 104 and end systems 106 (for example, one or more switches 104 and one or more end systems 106) are used. FIG. 1 represents at least one computer-based system network topology. In alternate embodiments, one or more different computer-based system network topologies are possible (for example, connecting one or more switches 104 directly with each other).

In one implementation, the switched network 100 is specified as a fully-switched network of the end systems $106_{1-1}$ to $106_{N-N}$. Each of the end systems $106_{1-1}$ to $106_{N-N}$ are capable of both sending and receiving data communications (that is, each connection to each of the end systems $106_{1-1}$ to $106_{N-N}$ is considered a full duplex connection). For example, on an avionics system network, each of the end systems $106_{1-1}$ to $106_{N-N}$ will be a line replaceable unit (LRU), or the like. In the example of the avionics system network, one or more data packets from the end system $106_{1-1}$ to the end system $106_{N-N}$ are routed through the central switch 102 and the switches $104_1$ to $104_N$.

In one implementation, data communication between one of the end systems $106_{1-1}$ to $106_{N-N}$ through the central switch 102 to one of the switches $104_1$ to $104_N$ represents a virtual link. The virtual link specifies a data flow over which one or more data frames are sent between one of the end systems $106_{1-1}$ to $106_{N-N}$. In this same implementation, the virtual link is defined between a network layer (for example, internet protocol, or IP) and a data link layer (for example, a media access control, or MAC layer). When the scheduling of one or more virtual links is established, a bandwidth allocation gap (BAG) is measured as a period at which each of the one or more virtual links are assigned a maximum available bandwidth. The maximum available bandwidth assigned will process a maximum data packet size (for example, once every period) for each virtual link established between each of the end systems $106_{1-1}$ to $106_{N-N}$.

The application layer 108 represents at least one computer-readable medium of instructions that, for example, exchanges data and control instructions between one or more input/output (I/O), general purpose computing, and special function computing modules on the avionics system network discussed above. The one or more I/O modules exchange the data and control instructions to and from, without limitation, sensors, actuators, and other external devices of the avionics system. The one or more general purpose and special function computing modules are responsible for, without limitation, display/graphics generation, signal and image processing, and other general computing functions.

In operation, the switched network 100 will route one or more data communication packets as specified by the application layer 108 between each of the end systems $106_{1-1}$ to $106_{N-N}$ through the central switch 102 and the switches $104_1$ to $104_N$. For each of the virtual links established between each of the end systems $106_{1-1}$ to $106_{N-N}$, the one or more data communication packets include all necessary routing and addressing information to allow bridging between one or more integrated computer-readable applications supported by the application layer 108 and other, additional (for example, Ethernet) networks without requiring additional network infrastructure.

Each of the virtual links established between each of the end systems $106_{1-1}$ to $106_{N-N}$ will also include one or more messages used to synchronize a system clock. This is analogous to scheduling a time slot for carrying each of the one or more messages. Further details on scheduling and time synchronization as they relate to the operation of the switched network 100 are described below with respect to FIG. 2. In one implementation, a transfer of one packet of the one or more data communications packets occurs as soon as a command to transfer the one packet is executed within the application layer 108 (that is, event-triggered). In at least one alternate implementation, the transfer of the one packet occurs at a fixed time or beyond a worst-case task completion deadline (that is, time-triggered). For both the event-triggered and time-triggered embodiments, the time slot is scheduled to substantially reduce timing (that is, jitter-related) errors within the switched network 100 to increase performance.

Figure 2:
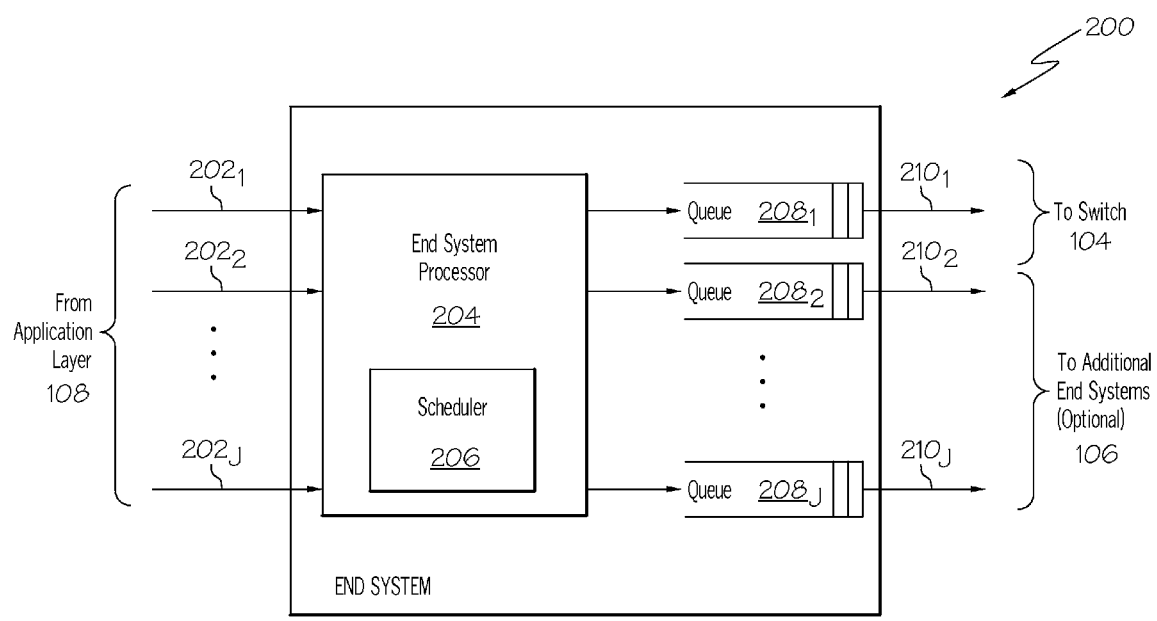
FIG. 2 is a block diagram of an embodiment of an end system transmitting data packets into the switched network of FIG. 1.

FIG. 2 is a block diagram of an embodiment of an end system 200 transmitting data packets into the switched network 100 of FIG. 1. In the example embodiment of FIG. 2, the end system 200 is representative of one of end systems $106_{1-1}$ to $106_{N-N}$ of FIG. 1. The end system 200 comprises an end system processor 204 and data packet queues $208_1$ to $208_J$. The end system processor 204 further comprises scheduler 206. The end system processor 204 receives a plurality of data packets from application layer 108 of FIG. 1 on streaming data packet signal lines $202_1$ to $202_J$. Each of data packet queues $208_1$ to $208_J$ transmit scheduled jitter-free data packets from end system 200 on synchronized data packet signal lines $210_1$ to $210_J$. It is noted that for simplicity in description, a total of three streaming data packet signal lines $202_1$ to $202_J$, three data packet queues $208_1$ to $208_J$, and three synchronized data packet signal lines $210_1$ to $210_J$ are shown in FIG. 2. However, it is understood that in other embodiments of the end system 200, different numbers of streaming data packet signal lines 202, data packet queues 208 and synchronized data packet signal lines 210 (for example, three or more streaming data packet signal lines 202, three or more data packet queues 208 and three or more synchronized data packet signal lines 210) are used.

In one implementation, the synchronized data packet signal line $210_1$ transmits at least one scheduled queue of data packets from data packet queue $208_1$ to one of the switches $104_1$ to $104_N$ of FIG. 1. Optionally, the synchronized data packet signal lines $210_2$ to $210_J$ transmit one or more scheduled queues of data packets from corresponding data packet queues $208_2$ to $208_J$ to end systems $106_{1-1}$ to $106_{N-N}$. Other implementations of similar end system 200 interconnections are possible.

Figure 3:
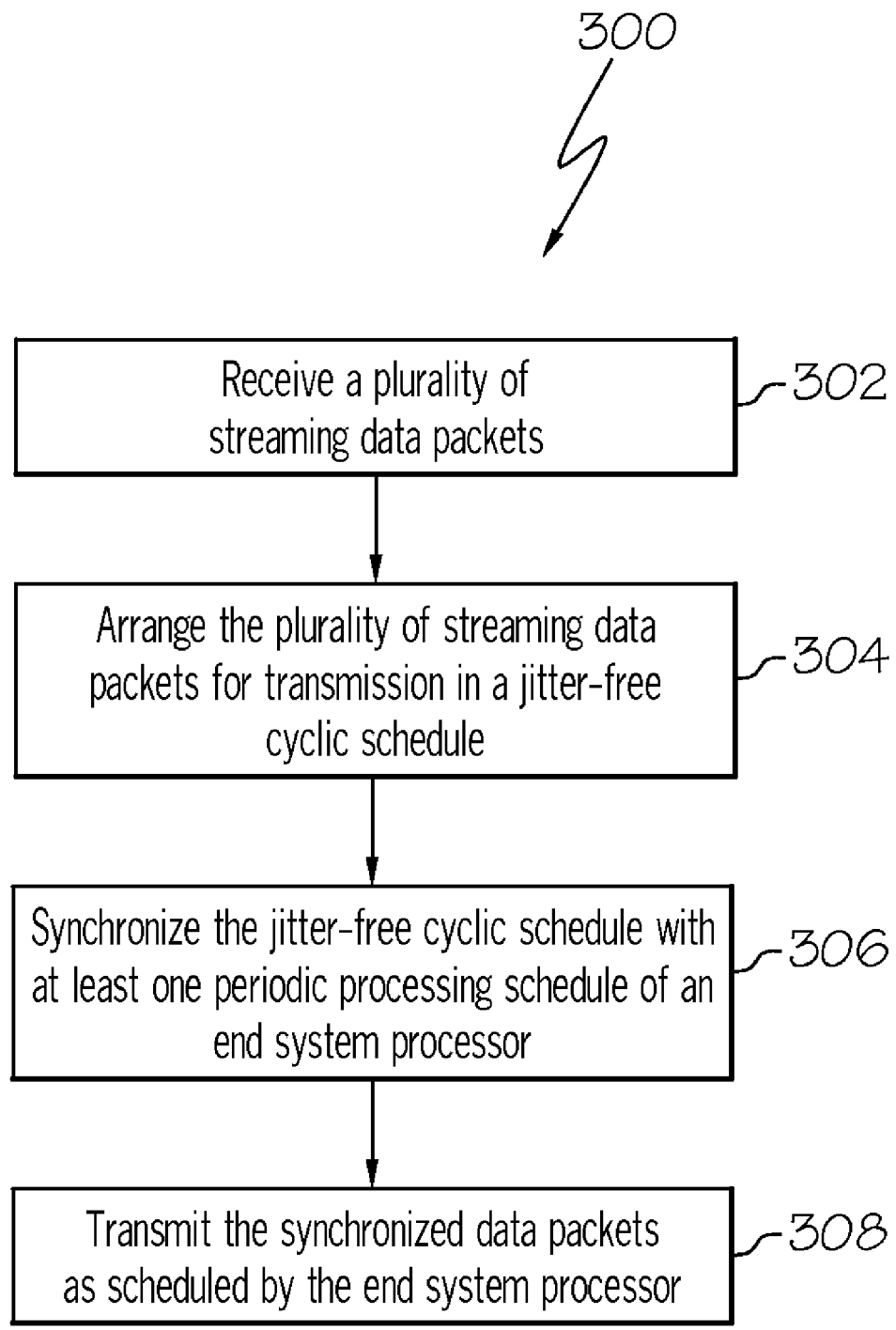
FIG. 3 is a flow diagram illustrating an embodiment of a method for transmitting synchronized data packets in the switched network of FIG. 1.

To further illustrate the operation of end system 200, FIG. 3 describes a method 300 for transmitting synchronized data packets from the end system 200. The end system processor 204 receives the plurality of streaming data packets from the streaming data packet signal lines $202_1$ to $202_J$ (block 302). The scheduler 206 arranges the plurality of streaming data packets into a jitter-free cyclic (that is, non-preemptive) schedule (block 304). The basis for determining the jitter-free cyclic schedule is described in further detail below with respect to FIG. 4. In the example embodiment of FIG. 2, the scheduler 206 is capable of arranging one or more jitter-free cyclic schedules for simultaneous transmission by the end system processor 204. Once each individual jitter-free cyclic schedule is complete, the end system processor 204 synchronizes each individual jitter-free cyclic schedule with at least one periodic processing schedule of the end system processor 204 (block 306). This synchronization involves placing the now-scheduled data packets in the proper data packet queues $208_1$ to $208_J$. The data packet queues $208_1$ to $208_J$ transmit the synchronized data packets along the synchronized data packet signal lines $210_1$ to $210_J$ as scheduled by the end system processor 204 (block 308).

As discussed above with respect to FIG. 1, various networking communications standards impose constraints on the maximum jitter of one or more virtual links commencing at the end system 200. The maximum jitter is limited to the amount of time required to transmit one data packet from each virtual link. A non-preemptive cyclic (that is, static) schedule, as described here, produces zero-jitter schedules that substantially satisfy the various network communication standards. The cyclic schedule for data packet queues $208_1$ to $208_J$ is synchronized with at least one periodic processing schedule of the end system processor 204. For example, data packet transmissions based on the cyclic schedule are scheduled into the same major cycle (or identical major cycles) on the end system processor 204. A data packet transmission through one output port (for example, synchronized data packet signal line $210_1$ for switch 104) occurs concurrently with data packet transmissions through one or more additional ports (for example, synchronized data packet signal lines $210_2$ to $210_J$ for additional end systems 106) on the end system processor 204.

Figure 4:
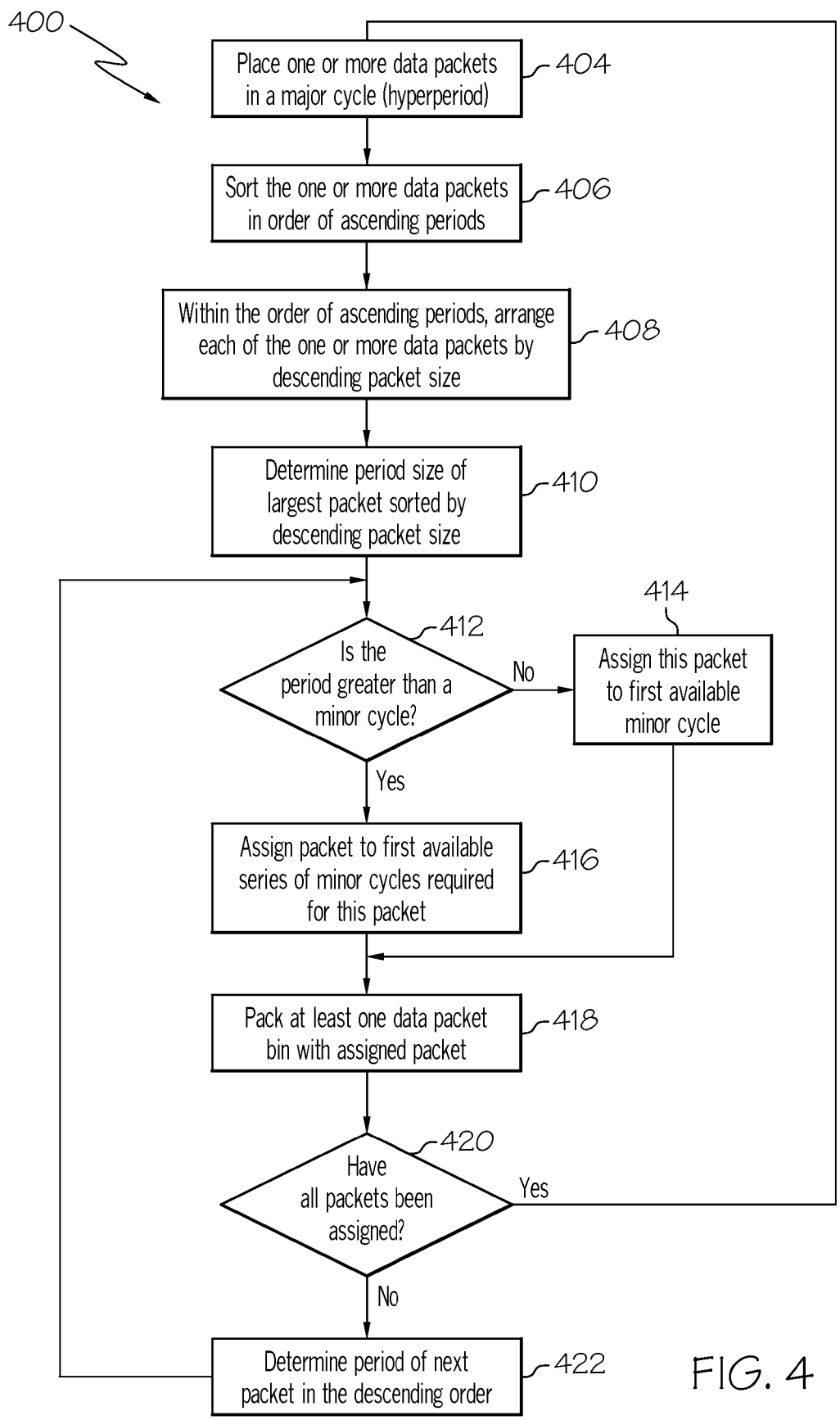
FIG. 4 is a flow diagram illustrating an embodiment of a method for constructing a cyclic schedule of one or more data packet transfers over the switched network of FIG. 1.

FIG. 4 is a flow diagram illustrating a method 400 for constructing a cyclic schedule of one or more data packet transfers over switched network 100. In the example embodiment of FIG. 4, after one or more data packets are placed in a major cycle (that is, a hyperperiod, or a potential packet transmission through an output port of the end system processor 204 of FIG. 2) at block 404, method 400 begins sorting the one or more data packets in order of ascending periods. A primary function of method 400 is to sort each data packet by smallest to largest period for placement into at least one data packet bin, creating a substantially jitter-free cyclic schedule for each of the end systems $106_{1-1}$ to $106_{N-N}$.

Once the one or more data packets are sorted in order of ascending period (block 406), each of the data packets are arranged by descending packet size within the order of ascending periods (block 408). At block 410, scheduler 206 of FIG. 2 begins creation of a cyclic schedule, beginning with the largest packet sorted by a descending packet size. For the largest packet sorted by the descending packet size (that is, a first scheduled packet), block 412 determines whether the period of the first scheduled packet is greater than a minor cycle (a set of minor cycles comprise the major cycle). If the period of the first scheduled packet is less than the minor cycle, the first scheduled packet is assigned to the first available minor cycle at block 414 and the assigned packet is packed into the at least one data packet bin at block 418. If the period of the first scheduled packet is greater than the minor cycle, the first scheduled packet is assigned to the first available series of minor cycles (block 416) that the first scheduled packet requires before the assigned packet is packed into the at least one data packet bin at block 418. The method 400 is repeated from steps 412 to 422 until each of the one or more data packets are assigned (that is, packed) into the at least one data packet bin. In one implementation, the at least one data packet bin is synonymous with one of data packet queues $208_1$ to $208_J$ of FIG. 2.

This description has been presented for purposes of illustration, and is not intended to be exhaustive or limited to the form (or forms) disclosed. Variations and modifications may occur, which fall within the scope of the embodiments described above, as set forth in the following claims.

What is claimed is:

1. A method for scheduling one or more data packet transfers over a computer-based distributed network, the method comprising:
   arranging a plurality of data packets in at least one major cycle of a periodic processing schedule to produce an arrangement of the plurality of data packets;
   sorting the arrangement of the plurality of data packets to produce a sorted arrangement;
   constructing a cyclic schedule from the sorted arrangement of the plurality of data packets;
   synchronizing the cyclic schedule with the at least one periodic processing schedule; and
   transmitting the synchronized data packets as arranged by the cyclic schedule and as scheduled by the at least one periodic processing schedule.

2. The method of claim 1, further comprising obtaining a number of the plurality of data packets to place in at least one major cycle.

3. The method of claim 1, wherein constructing the cyclic schedule further comprises:
   sorting the plurality of data packets in order of ascending periods;
   within the sorted order of ascending periods, arranging each of the plurality of data packets by descending packet size;
   assigning each arranged data packet to a first available minor cycle; and
   packing each assigned data packet in at least one data packet bin.

4. The method of claim 1, wherein synchronizing the cyclic schedule with the at least one periodic processing schedule comprises placing the scheduled data packets into data packet queues for processing on identical major cycles.

5. The method of claim 1, wherein transmitting the synchronized data packets as arranged by the cyclic schedule further comprises transmitting the synchronized data packets as an event-triggered transfer over a virtual link.

6. The method of claim 1, wherein transmitting the synchronized data packets as arranged by the cyclic schedule further comprises transmitting the synchronized data packets as a time-triggered transfer over a virtual link.

7. A program product comprising a plurality of program instructions embodied on a processor-readable medium, wherein the program instructions are operable to cause one or more devices included in a distributed processing network to:
   arrange a plurality of data packets in at least one major cycle of at least one periodic processing schedule to produce an arrangement of the plurality of data packets;
   sort the arrangement of the plurality of data packets in order of ascending periods in the at least one major cycle of at least one periodic processing schedule to produce a sorted arrangement; and
   within the sorted arrangement, arrange each of the plurality of data packets by descending packet size in a cyclic schedule, wherein the cyclic schedule is constructed from the sorted arrangement of the plurality of data packets;
   synchronize the cyclic schedule with the at least one periodic processing schedule; and
   transmit each of the arranged data packets as arranged by the cyclic schedule and as scheduled by the at least one periodic processing schedule over the distributed processing network.

8. The program product of claim 7, wherein the distributed processing network comprises a switched network.

9. The program product of claim 7, wherein the distributed processing network comprises an avionics system network.

10. The program product of claim 7, wherein each device is an end system capable of full-duplex communications in a switched network.

11. The program product of claim 7, wherein each data packet is assigned to a first available minor cycle within the cyclic schedule.

12. The program product of claim 11, wherein each assigned data packet is packed into at least one data packet bin prior to transmission.

13. A switched network, comprising:
   a central switch;
   one or more network switches in communication with the central switch;
   one or more end systems in communication with the one or more network switches, the one or more end systems adapted to synchronize a cyclic schedule with at least one periodic processing schedule, the cyclic schedule constructed from sorting an arrangement of one or more data communication packets placed in at least one major cycle of the at least one periodic processing schedule; and
   at least one application layer responsive to data communication between the one or more end systems, the data communication comprising transmission of the synchronized data communications packets as arranged in the cyclic schedule and as scheduled by the at least one periodic processing schedule.

14. The switched network of claim 13, wherein the switched network comprises an avionics system network.

15. The switched network of claim 14, wherein the at least one application layer transfers data and control instructions between one or more computing modules on the avionics system network.

16. The switched network of claim 13, wherein the one or more end systems further comprise:
   a processor;
   a scheduler responsive to the processor; and
   one or more data packet queues responsive to the scheduler, the one or more data packet queues transmitting the one or more synchronized data communication packets as arranged in the cyclic schedule at a maximum available bandwidth.

17. The switched network of claim 13, wherein the one or more end systems are capable of full-duplex communications.

18. The switched network of claim 13, wherein the one or more data communication packets are transmitted to at least one of the one or more network switches.

19. The switched network of claim 13, wherein the one or more data communication packets are transmitted between the one or more end systems.

20. The switched network of claim 13, wherein the one or more data communication packets include all necessary routing and addressing information to allow bridging between one or more integrated computer-readable applications supported by the at least one application layer without requiring additional network infrastructure.

* * * * *